United States Patent
Garrison et al.

(10) Patent No.: US 6,769,118 B2
(45) Date of Patent: Jul. 27, 2004

(54) DYNAMIC, POLICY BASED MANAGEMENT OF ADMINISTRATIVE PROCEDURES WITHIN A DISTRIBUTED COMPUTING ENVIRONMENT

(75) Inventors: John M. Garrison, Austin, TX (US); Rose Anne Swart, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 490 days.

(21) Appl. No.: 09/740,434

(22) Filed: Dec. 19, 2000

(65) Prior Publication Data

US 2002/0091939 A1 Jul. 11, 2002

(51) Int. Cl.[7] .............................................. G06F 9/445
(52) U.S. Cl. ...................... 717/177; 717/172; 717/173; 717/176; 709/201; 709/203; 709/217
(58) Field of Search ................................ 717/169–172, 717/175–177, 103; 709/202, 203, 219, 201, 217; 707/204, 206

(56) References Cited

U.S. PATENT DOCUMENTS

| | | | |
|---|---|---|---|
| 3,916,177 A | 10/1975 | Greenwald | |
| 4,030,072 A | 6/1977 | Bjornsson | |
| 5,181,107 A | 1/1993 | Rhoades | |
| 5,367,667 A | 11/1994 | Wahlquist et al. | |
| 5,495,722 A | 3/1996 | Manson et al. | |
| 5,528,661 A | 6/1996 | Siu et al. | |

(List continued on next page.)

OTHER PUBLICATIONS

Title: Process Migration, author Milojicic et al ACM, Sep., 2000.*

(List continued on next page.)

Primary Examiner—Chameli Chaudhuri Das
(74) Attorney, Agent, or Firm—Cardinal Law Group; Jeffrey S. LaBaw

(57) ABSTRACT

An administrative management system comprising an administrative server and a client is disclosed. In response to a selection of an administrative procedure to be executed on the client, the administrative server determines if an execution of the administrative procedure on the client is in compliance with one or more corresponding policies. If the execution is in compliance with the corresponding policy or policies, the administrative server determines the storage location of the administrative procedure. If the selected administrative procedure is stored on the client, the administrative server executes the administrative procedure on the client. If the selected administrative procedure is stored on the administrative server, the administrative server pushes a corresponding script of the administrative procedure from the administrative server to the client and then installs and executes the script on the client. If the selected administrative procedure is stored at a remote location, the administrative server pushes a corresponding script of the administrative procedure from the remote location to the client and then installs and executes the script on the client.

6 Claims, 5 Drawing Sheets

U.S. PATENT DOCUMENTS

| | | | |
|---|---|---|---|
| 5,603,323 A | | 2/1997 | Pflugrath et al. |
| 5,732,268 A | | 3/1998 | Bizzarri |
| 5,742,829 A | * | 4/1998 | Davis et al. ................. 717/178 |
| 5,802,291 A | * | 9/1998 | Balick et al. ................ 709/202 |
| 5,838,910 A | * | 11/1998 | Domenikos et al. ........ 709/203 |
| 5,838,916 A | * | 11/1998 | Domenikos et al. ........ 709/219 |
| 5,845,061 A | * | 12/1998 | Miyamoto et al. .............. 714/4 |
| 5,864,484 A | | 1/1999 | Harding |
| 6,023,773 A | * | 2/2000 | O'Donnell et al. ........... 714/40 |
| 6,085,244 A | | 7/2000 | Wookey |
| 6,167,567 A | * | 12/2000 | Chiles et al. ................ 717/173 |
| 6,219,666 B1 | * | 4/2001 | Krishnaswamy et al. ....... 707/8 |
| 6,223,345 B1 | * | 4/2001 | Jones et al. ................. 717/100 |
| 6,243,719 B1 | * | 6/2001 | Ikuta et al. .................. 707/204 |
| 6,321,258 B1 | * | 11/2001 | Stollfus et al. .............. 709/220 |
| 6,327,608 B1 | * | 12/2001 | Dillingham .................. 709/203 |
| 6,363,403 B1 | * | 3/2002 | Roy et al. .................... 707/206 |
| 6,470,346 B2 | * | 10/2002 | Morwood .................... 707/101 |
| 6,571,389 B1 | * | 5/2003 | Spyker et al. .............. 717/176 |

OTHER PUBLICATIONS

Title: Building a robust workflow management system with persistent queues and stored procedures , Leymann et al, IEEE, 1998.*

Title: Client–Server Computing, author: Alok Sinha, ACM, 1992.*

Title: A predicate–based caching scheme for client–server database architectures, Keller et al, ACM , 1996.*

* cited by examiner though the scope of the invention being defined by the appended claims and equivalents thereof.

DYNAMIC, POLICY BASED MANAGEMENT OF ADMINISTRATIVE PROCEDURES WITHIN A DISTRIBUTED COMPUTING ENVIRONMENT

BACKGROUND OF THE INVENTION

1. Field of the Invention

The present invention generally relates to administrative systems, and more particularly to managing various procedures in a distributed computing environment.

2. Description of the Related Art

Administrative servers are operated to execute administrative procedures on the client. Invariably, the administrative procedure must be installed on the client prior to any attempt by the administrative server to execute the administrative procedure on the client. In a highly distributed computing environment, the administrative server may have the responsibility of executing a significant number of administrative procedures on each client. However, it is impractical, if not infeasible, to store each administrative procedure on each client. Additionally, a client can misuse the administrative procedure. Such misuse, whether intentional, unintentional, or inadvertent, can result in administrative problems. For example, a client may open a port of a firewall that is intended to be closed, and a hacker who otherwise would not have access to the environment may enter through the opened port. Also by example, a client may close a port of a firewall that is intended to be open whereby an e-business is shut down.

The computer industry is therefore continually striving to improve upon the management of administrative procedures in a highly distributed computing environment.

SUMMARY OF THE INVENTION

One form of the present invention is a first method for managing an administrative procedure. In one embodiment, a first set of one or more administrative procedures are stored on an administrative server. A second set of one or more administrative procedures is stored on a client. A centralized management of the three sets of administrative procedures is provided to the administrative server.

In a second embodiment, a first set of one or more administrative procedures is stored on a client. An administrative procedure is selected to be executed on the client. A determination of whether an execution of the administrative procedure on the client is in compliance with one or more polices is performed.

In a third embodiment, an administrative procedure is to be executed on the client is selected. A script corresponding to the selected administrative procedure is pushed from a remote location to the client.

A second form of the present invention is a distributed computing system comprising an administrative server and a client operable to store a first set of one or more administrative procedures. In one embodiment, the administrative server is operable to store a second set of one or more administrative procedures, and to centrally manage both sets of administrative procedures.

In a second embodiment, the administrative server is operable to determine if an execution of an administrative procedure on the client is in compliance with one or more polices.

A third form of the present invention is a computer program product in a computer usable medium. The computer program product comprises a means for selecting an administrative procedure to executed on a client; and a means for pushing a script corresponding to the administrative procedure from a remote location to the client.

The foregoing forms and other forms, features and advantages of the present invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1A:
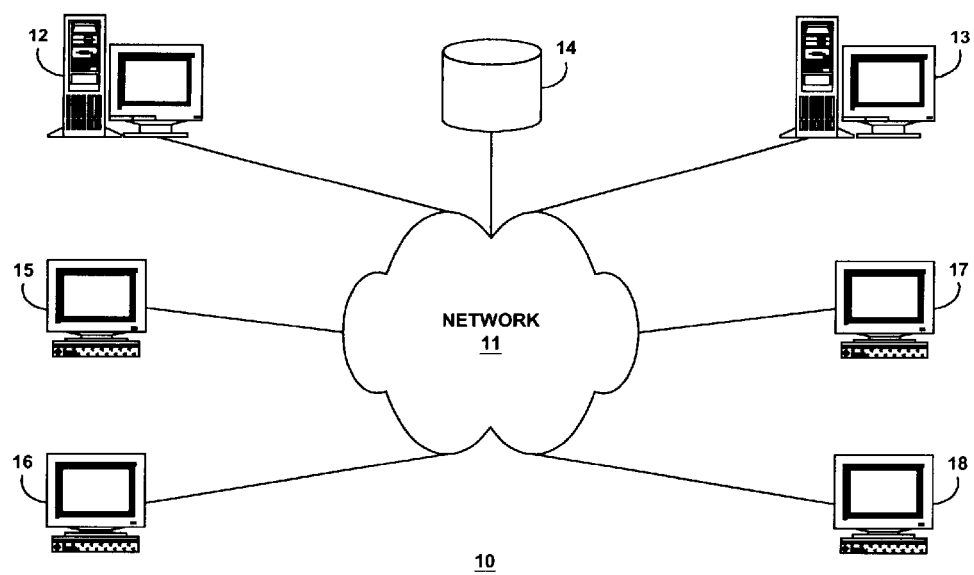
FIG. 1A is schematic diagram of network of distributed data processing systems as known in the art.

With reference now to the figures, FIG. 1A depicts a network of data processing systems. Distributed data processing system 10 contains network 11, which is the media used to provide communications links between various devices and computers connected together within distributed data processing system 10. Network 11 may include permanent connections, such as wire or fiber optic cables, or temporary connections made through telephone or wireless communications.

In the depicted example, a server 12 and a server 13 are connected to network 11 along with a database 14. In addition, a client 15, a client 16, a client 17, and a client 18 are connected to network 11. Servers 12 and 13, and clients 14–17 may be represented by a variety of computing devices, such as mainframes, personal computers, personal digital assistants (PDAs), etc. Distributed data processing system 10 may includes additional servers, clients, networks, routers, and other devices not shown.

Distributed data processing system 10 may include the Internet with network 11 representing a worldwide collection of networks and gateways that use the TCP/IP suite of protocols to communicate with one another. Of course, distributed data processing system 10 may also include a number of different types of networks, such as, for example, an intranet, a local area network (LAN), or a wide area network (WAN).

The present invention could be implemented on a variety of hardware platforms. FIG. 1A is intended as an example of a heterogeneous computing environment and not as an architectural limitation for the present invention.

Figure 1B:
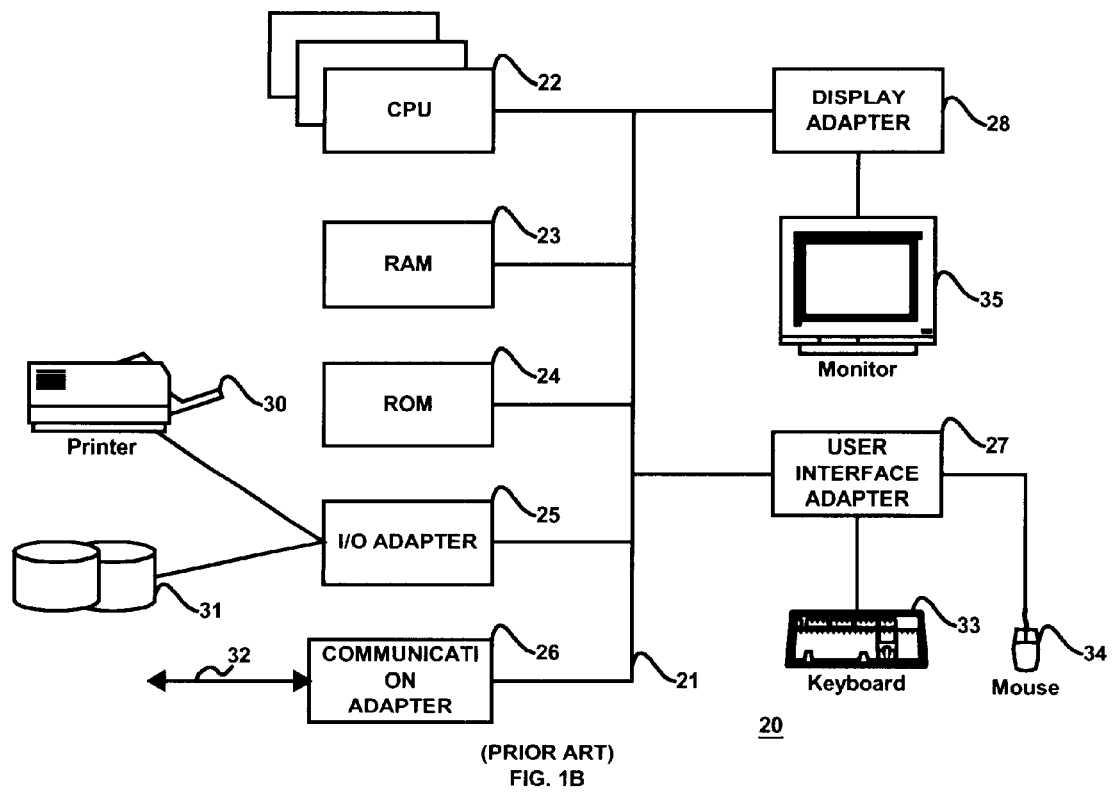
FIG. 1B is a schematic diagram of computer architecture of a data processing system as known in the art.

With reference now to FIG. 1B, a diagram depicts typical computer architecture of a data processing system, such as those shown in FIG. 1A, in which the present invention may be implemented. Data processing system 20 contains one or more central processing units (CPUs) 22 connected to internal system bus 21, which interconnects random access memory (RAM 23, read-only memory (ROM) 24, and input/output adapter 25, which supports various I/O devices, such as printer 30, disk units 31, or other devices not shown, such as a sound system, etc. A communication adapter 26, a user interface adapter 27, and a display adapter 28 are also connected to bus 21. Communication adapter 26 provides bus 21 with access to a communication link 32. User interface adapter 27 connects bus 21 to various user devices, such as keyboard 33 and mouse 34, or other devices not shown, such as a touch screen, stylus, etc. Display adapter 28 connects bus 21 to a display device 35.

Those of ordinary skill in the art will appreciate that the hardware in FIG. 1B may vary depending on the system implementation. For example, the system may have one or more processors, and other peripheral devices may be used in addition to or in place of the hardware depicted in FIG. 1B. The depicted example is not meant to imply architectural limitations with respect to the present invention. In addition to being able to be implemented on a variety of hardware platforms, the present invention may be implemented in a variety of software environments. A typical operating system may be used to control program execution within the data processing system.

Figure 2:
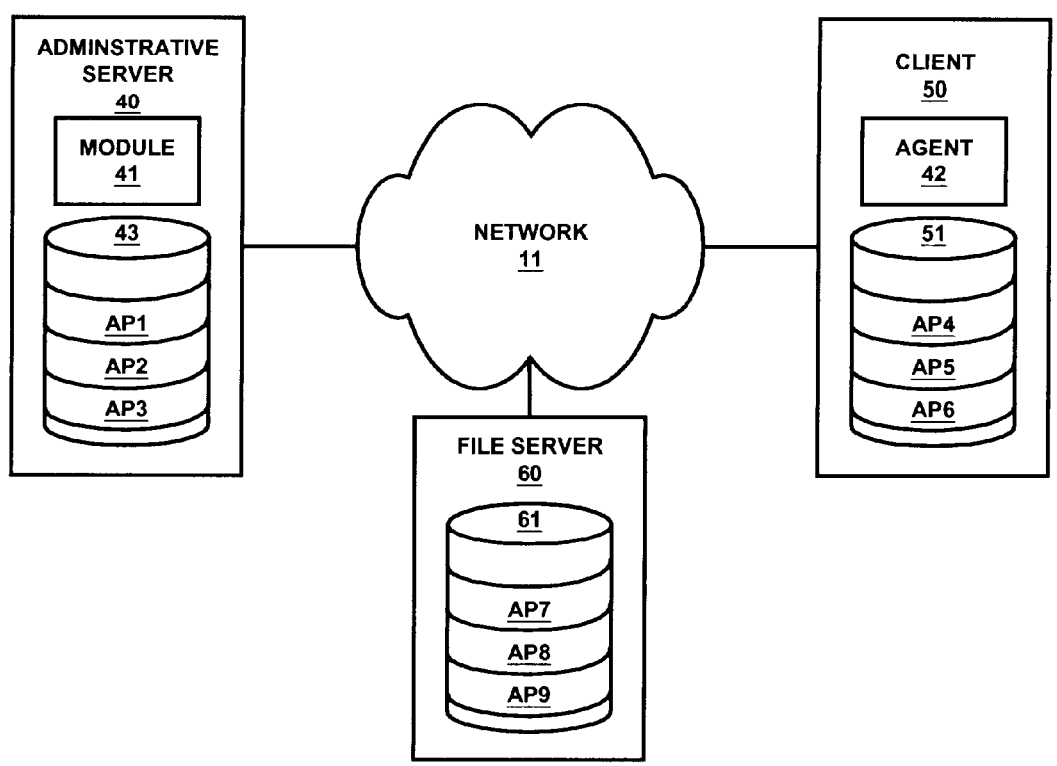
FIG. 2 is a block diagram of one embodiment of an administrative server, a client, and a file server in accordance with the present invention.

Referring to FIG. 2, an administrative server 40, a client 50, and a file server 60 in accordance with the present invention are shown. Administrative server 40 includes a module 41 for implementing a policy compliance routine 70 shown in FIG. 3 and a dynamic push routine 90 as shown in FIG. 4. Administrative server 40 further includes an agent 42 stored within client 50 for assisting in the implementation of routine 90, and a memory 43 for storing an administrative procedure AP1, an administrative procedure AP2, and an administrative procedure AP3. In other embodiments of administrative server 40, memory 43 can be remotely located from administrative server 40 and accessible via network 11. Also in other embodiments of administrative server 40, more than or less than three (3) administrative procedures can be stored within memory 43.

"Client 50 includes a memory 51 for storing an administrative procedure AP4, an administrative procedure AP5, and an administrative procedure AP6. In other embodiments of client 50, memory 51 can be remotely located from client 50 and accessible via network 11. Also in other embodiments of client 50, more than or less than three (3) administrative procedures can be stored within memory 51."

File server 60 includes a memory 61 for storing an administrative procedure AP7, an administrative procedure AP8, and an administrative procedure AP9. In other embodiments of file server 60, memory 61 can be remotely located from server 60 and accessible via network 11. Also in other embodiments of server 60, more than or less than three (3) administrative procedures can be stored within memory 61.

In other embodiments of the present invention, administrative server 40 and file server 60 can be combined as one machine.

Figure 3:
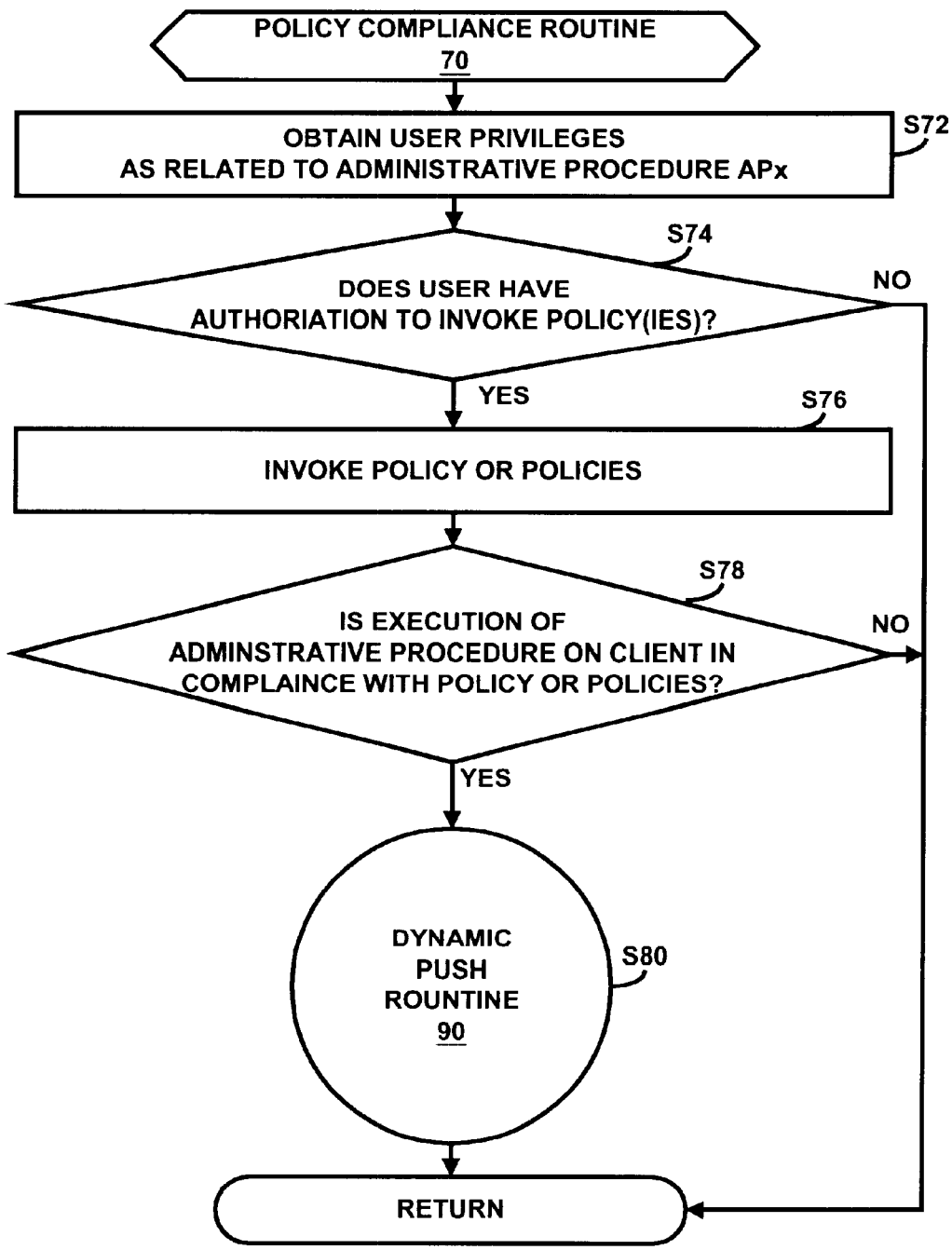
FIG. 3 is a flow chart illustrating one embodiment of policy compliance routine in accordance with the present invention.
Figure 4:
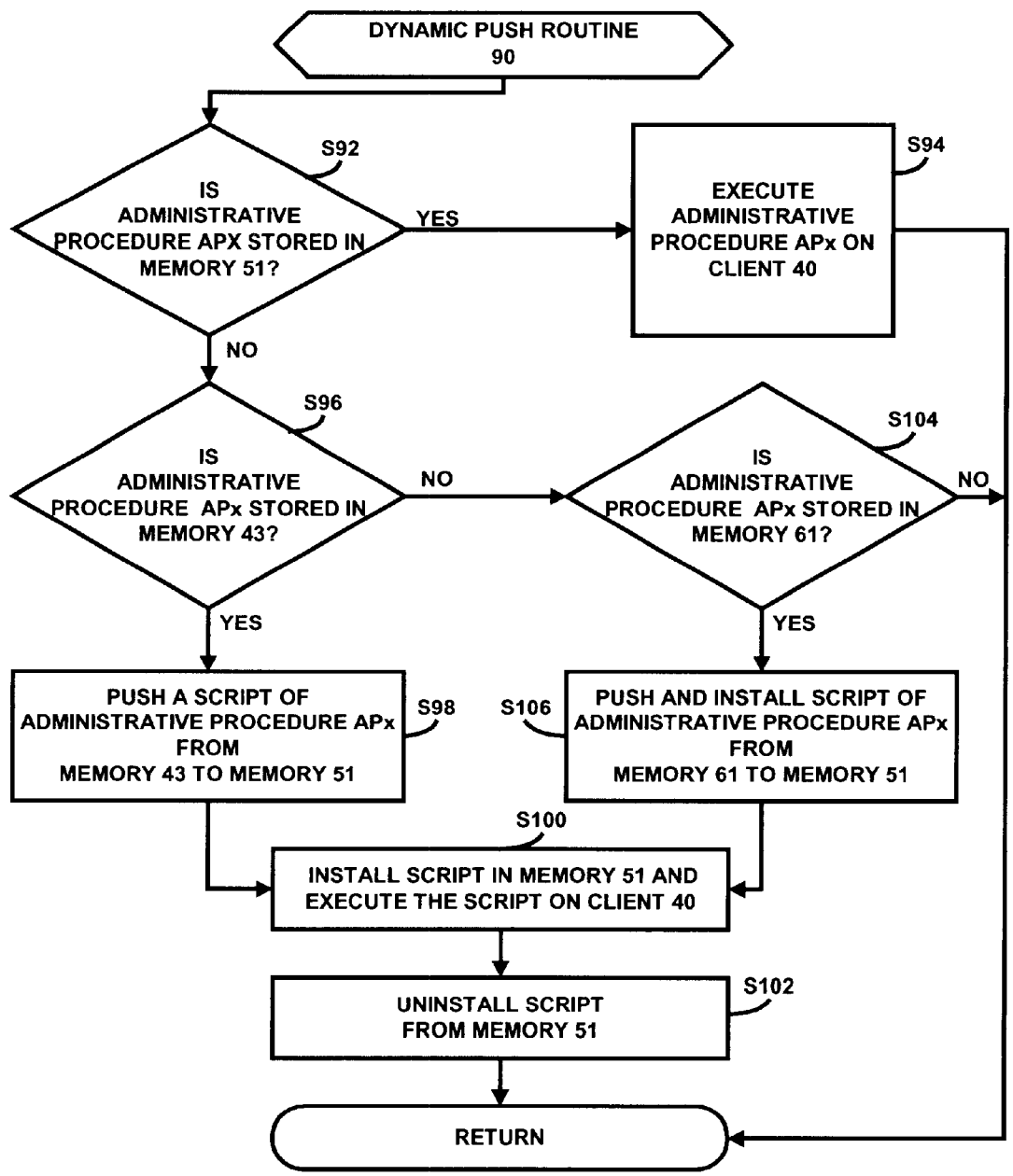
FIG. 4 is a flow chart illustrating one embodiment of dynamic push routine in accordance with the present invention.

Referring additionally to FIG. 3, module 41 implements routine 70 in response to a signal from an administrator of administrative server 40 that indicates a desire to execute administrative procedure APx on client 50. Administrative procedure APx can be a diagnostic procedure, a recovery procedure, a maintenance procedure, or a similar type of procedure. Examples of a diagnostic procedure include an anti-virus scan procedure, a port status test procedure, an active user test procedure, a software test procedure, and a valid user test procedure. Examples of a recovery procedure include a deactivate user identification procedure, a create/enable user identification procedure, an open/close firewall port procedure, a reboot machine procedure, a remove file(s) procedure, and a restore file(s) procedure. Examples of a maintenance procedure are a remove unused/outdated software procedure, a remove user identification procedure, an install software package procedure, and a back-up software procedure.

During a stage S72 of routine 70, module 41 obtains privileges of user to invoke one or more policies corresponding to an execution of administrative procedure APx on client 50. In one embodiment, the administrator provides a user identification. During a stage S74 of routine 70, module 41 determines if the user has authorization to invoke the policy(ies). If module 41 determines during stage S74 that the user does not have authorization to invoke the policy (ies), then module 41 proceeds to terminate routine 70. If module 41 determines during stage S74 that the user does have authorization to invoke the policy(ies), then module 41 proceeds to stage S76 to invoke the policy(ies). Examples of a policy include a list of machine types for executing administrative procedure APx, an appropriate electrical communication structure between administrative server 40 and client 50, and a list of any billing or licensing restrictions relating to executing administrative procedure APx on client 50.

During a stage S78 of routine 70, module 41 determines if an execution of administrative procedure APx on client 50 in compliance with the policy(ies). If module 41 determines during stage S78 that the user an execution of administrative procedure APx on client 50 is not in compliance with the policy(ies) (e.g., client 50 has an unlisted machine type, client 50 communicates with administrative server 40 over an intranet when the internet is the appropriate electrical communication structure, and/or client 50 does not have a listed service plan), then module 41 proceeds to terminate routine 70. If module 41 determines during stage S78 that the user an execution of administrative procedure APx on client 50 is in compliance with the policy(ies) (e.g., client 50 has a listed machine type, client 50 communicates with administrative server 40 over the internet, and client 50 does have a listed service plan), then module 41 proceeds to stage S80 of routine 70 to implement routine 90.

"Referring additionally to FIGS. 2 and 4, module 41 implements routine 90 to execute administrative procedures APX on client 50. During stage S92 of routine 90, module 41 determines whether administrative procedure APx is stored in memory 51 of client 50. In one embodiment, contents of memory 51 are displayed on administrative server 40 as known by those with ordinary skill in the art whereby an administrator of administrator server 40 may ascertain if administrative procedure APx is stored in memory 51."

If administrative procedure APx is stored in memory 51, e.g., administrative procedure APx is one of administrative procedures AP4–AP6, then module 41 proceeds to stage S94 of routine 90 to execute administrative procedure APx on client 50. In one embodiment, agent 42 monitors the executing of administrative procedure APx on client 50 as known by those of ordinary skill in the art.

If administrative procedure APx is not stored in memory 51, then module 41 proceeds to stage S96 of routine 90 to determine whether the administrative procedure APx is stored in memory 43 of administrative server 40. If administrative procedure APx is stored in memory 43, e.g., administrative procedure APx is one of administrative procedures AP1–AP3, then module 41 sequentially proceeds to a stage S98 of routine 90 to push a script corresponding to administrative procedure APx from memory 43 to memory 51, and to a stage S100 of routine 90 to install script in memory 51 and execute the script on client 50. Upon an execution of the script on client 50, module 41 proceeds to a stage S102 of routine 90 to uninstall the script from memory 51 whereby client 50 is prevented from deleting, or otherwise corrupting administrative procedure APx. Routine 90 is terminated after stage S102.

If administrative procedure APx is not stored in memory 43, then module 41 proceeds to stage S104 of routine 90 to determine whether the administrative procedure APx is stored in memory 61 of file server 60. If administrative procedure APx is not stored in memory 61, e.g., administrative procedure APx is not one of administrative procedures AP7–AP9, then routine 90 is terminated. If administrative procedure APx is stored in memory 61, e.g., administrative procedure APx is one of administrative procedures AP7–AP9, then module 41 sequentially proceeds to a stage S106 of routine 90 to push the corresponding script from memory 61 to memory 51, and to a stage S100 to install script in memory 51 and execute the script on client 50. Upon an execution of the script on client 50, module 41 again proceeds to stage S102 to uninstall the script from memory 51 whereby client 50 is again prevented from deleting, or otherwise corrupting administrative procedure APx. Routine 90 is terminated after stage S110.

From the succeeding description herein of routine 70 and routine go as implemented by module 41, those with ordinary skill in the art will appreciate a centralized management of administrative procedures AP1–AP9 by module 41. Those with ordinary skill in the art will further appreciate that routine 90 provides many benefits to a highly distributed environment, including, but not limited to, a safeguarding of administrative procedures AP1–AP3 and administrative procedures AP7–AP9 for the environment by making administrative procedures AP1–AP3 and administrative procedures AP7–AP9 only available to an administrator or administrators of the environment.

It is important to note that while the present invention has been described in the context of a fully functioning data processing system, those of ordinary skill in the art will appreciate that the processes of the present invention are capable of being distributed in the forms of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, CD-ROM, and transmission-type media, such as digital and analog communications links.

While the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method, comprising:
    storing a set of at least one administrative procedure on a client;
    selecting a first administrative procedure to execute on said client;
    determining if said executing of said first administrative procedure on said client is in compliance with a corresponding set of at least one policy; and
    pushing a first script corresponding to said first administrative procedure from a remote location to said client when said executing of said first administrative procedure on said client is in compliance with said set of at least one policy and said first administrative procedure is excluded from said set of at least one administrative procedure.

2. The method of claim 1, further comprising:
    executing said first administrative procedure on said client when said executing of said first administrative procedure on said client is in compliance with said set of at least one policy and said first administrative procedure is included within said set of at least one administrative procedure.

3. The method of claim 1, further comprising:
    installing said first script on said client;
    executing said first script on said client; and
    uninstalling said first script from said client upon completing said execution of said first script on said client.

4. A distributed computing system, comprising:
    a client operable to store a set of at least one administrative procedure on said client;
    an administrative server to determine if an execution of a first administrative procedure on said client is in compliance with a corresponding set of at least one policy; and wherein said administrative server is further operable to push a first scrip corresponding to said first administrative procedure from a remote location to said client when said executing of said first administrative procedure on said client is in compliance with said set of at least one policy and said first administrative procedure is excluded from said set of at least one administrative procedure.

5. The distributed computing system of claim 4, wherein said administrative server is further operable to execute said first administrative procedure on said client when said executing of said first administrative procedure on said client as in compliance with said set of at least one policy and said first administrative procedure is included within said set of at least one administrative procedure.

6. The distributed computing system of claim 4, wherein said administrative server is further operable to install and execute said first scrip on said client; and
    said administrative server is further operable to uninstall said first script from said client upon completing an execution of said first script on said client.

* * * * *

UNITED STATES PATENT AND TRADEMARK OFFICE
CERTIFICATE OF CORRECTION

PATENT NO. : 6,769,118 B2
DATED : July 27, 2004
INVENTOR(S) : Garrison et al.

It is certified that error appears in the above-identified patent and that said Letters Patent is hereby corrected as shown below:

Column 5,
Line 30, should read -- routine 90 as implemented by module 41, those with ordi- --

Signed and Sealed this

Twenty-eighth Day of December, 2004

JON W. DUDAS
*Director of the United States Patent and Trademark Office*